A. R. WARD.
CHECKING AND UNCHECKING DEVICE.
APPLICATION FILED MAR. 16, 1908.
911,857.
Patented Feb. 9, 1909.
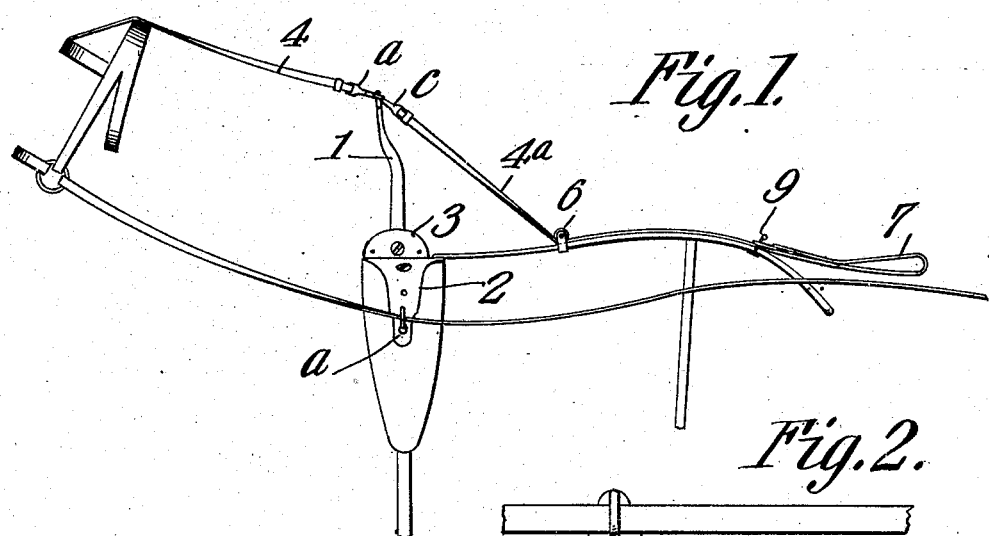
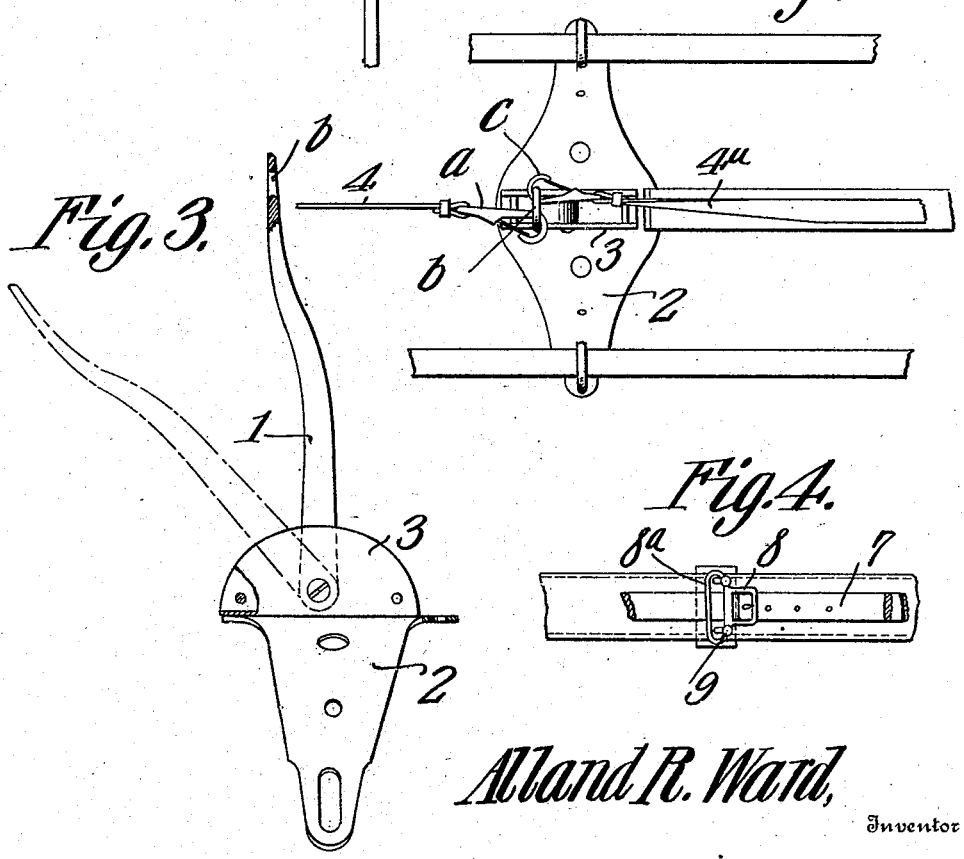
Alland R. Ward,
Inventor
Witnesses

UNITED STATES PATENT OFFICE.

ALLAND ROSWELL WARD, OF INTERVALE, NEW HAMPSHIRE, ASSIGNOR OF ONE-HALF TO BARKER L. BURBANK, OF WOODFORDS, MAINE.

CHECKING AND UNCHECKING DEVICE.

No. 911,857.　　　　Specification of Letters Patent.　　　　Patented Feb. 9, 1909.

Application filed March 16, 1908. Serial No. 421,346.

*To all whom it may concern:*

Be it known that I, ALLAND ROSWELL WARD, a citizen of the United States, residing at Intervale, in the county of Carroll and State of New Hampshire, have invented a new and useful Checking and Unchecking Device, of which the following is a specification.

My invention relates to certain improvements in devices for checking and unchecking horses.

It has for its object more particularly to effect that purpose in a convenient manner without requiring the driver to leave the vehicle, and to effect the same in a simple, expeditious manner.

It, also, contemplates the carrying out of said end with humane purposes in view, as will be described later.

Additional objects and advantages of my invention will, also, appear from the subjoined description and accompanying illustration.

While said invention may be readily applied for generally checking and unchecking horses hitched to a vehicle as above noted, its principal object is to relieve race horses on the track. It is the practice to have the horse wear the check from the time it leaves the stable until after the finish of the race, which prolonged wearing of said check is objectionable and is unnecessary. With the use of my invention the check may be readily brought into requisition; also, it may be quickly released at a given signal as at the start of the race, and thus save the horse to "fight" the race. After the horse has gone a short distance on the track the driver may relieve the strain by relaxing the pull on the check-strap as later disclosed to allow the horse to come in stronger.

The invention also provides for the holding of the animal's nose straight outwardly, as is necessary with some horses, thus obviating the employment of what is termed as an "iron-bridge" commonly applied to the animal's nose for that purpose.

Said invention consists of certain features of construction, arrangement and combination of parts substantially as hereinafter more fully disclosed and specifically pointed out by the claims.

In the accompanying drawings, illustrating the preferred embodiment of my invention, Figure 1 illustrates the same as applied to certain harness members. Fig. 2 is a broken detail plan view of the same. Fig. 3 is an enlarged detail view of one of the parts of my invention. Fig. 4 is a like view of another part thereof.

Similar numerals of reference are employed to indicate corresponding parts throughout the several figures of the drawings.

In carrying out my invention, I suitably attach to an ordinary harness saddle a plate 2, the same being conformed to the general cross section thereof, said plate 2 being formed with upstanding parallel flanges 3 between which is pivoted a preferably bent lever 1. Between said lever, at its outer or upper end, and the horse's bridle at the head-end thereof, is effected a connection by means of a strap 4, preferably equipped with a snap-hook $a$ engaging an eye or loop 5 in said end of lever. An additional strap $4^a$ is similarly connected, as at $c$ to said end of said lever and passed under a roll equipped frame 6 secured to the harness back strap, said strap having its inner or rear end formed into a hand-hold or loop 7 for convenient grasping. Said strap is equipped with a buckle 8 which provides for forming the loop 7, and which has formed therewith an elongated transverse frame or loop $8^a$ adapted for the reception or engagement with upstanding headed pins 9 secured to the back strap, near the crupper-end thereof. It will be noted that by the driver or occupant of the vehicle suitably pulling upon the strap $4^a$ the lever 1 may be elevated into the position particularly indicated in Fig. 1, and the horse or animal thereby be subjected to restraint or checked, the loop or frame $8^a$ of the loop-forming buckle 8 then being caught over the pins or studs 9, and that by unhooking said strap $4^a$ at the point indicated the lever 1 will be permitted to swing downwardly and forwardly, as indicated by dotted lines in Fig. 3, thus releasing the stressing or checking action upon the horse.

By means of the foregoing arrangement it will be observed that the restraint or stress upon the horse may be very readily and conveniently relieved, or said straining or stressing action be quickly brought to bear upon the animal whenever it may be desired, thus providing for obviating the keeping of the horse under continual stress or strain, as is apparent. This device is designed particularly as a humane attachment for the purposes described, as in handling of race horses, which will be readily appreciated. Also, it is noted that with the lever 1 standing and held in a perfectly erect position, as indicated in Figs. 1 and 2, by suitably manipulating the check strap, such a checking action may be exerted as to effect the throwing and holding of the animal's nose straight outwardly as aforesaid.

It is further remarked that the base plate 2 with its lever 1 is suitably applied to any harness saddle, simply by displacing the saddle horn, water-hook and D's, the latter, however, being replaced by having their shanks inserted through slots *a* provided in the base-plate 2 and entering the saddle.

Latitude is allowed herein as to details regarding the construction, arrangement and disposition of the aforesaid parts and the invention still be protected.

What is claimed is:—

1. In a device of the character described, a saddle, a saddle plate, a lever having one end pivotally attached thereto, a top check strap held on the free end of said lever, a bridle to which said check strap is attached, an actuating strap attached to said lever provided with a combined buckle and rigidly attached elongated loop, a back strap connected to said saddle, a guide for said actuating strap located on said back strap, and a pair of headed pins rigidly secured to the back strap near the crupper end thereof to coact with the ends of said elongated loop and hold the lever in raised position.

2. In a device of the character described, a saddle, a saddle plate, a lever having one end pivotally attached thereto, a top check strap held on the free end of said lever, a bridle to which said check strap is attached, an actuating strap attached to said lever provided with a combined buckle and rigidly attached elongated loop, said loop being of greater length than the width of said strap and buckle, a back strap connected to the saddle of greater width than the actuating strap, a guide for said actuating strap located on said back strap, and a pair of headed pins rigidly secured to the back strap near the crupper end thereof in position to lie on each side of the actuating strap and coacting with the ends of the elongated loop to hold the lever in raised position.

In testimony that I claim the foregoing as my own, I have hereto affixed my signature in the presence of two witnesses.

ALLAND ROSWELL WARD.

Witnesses:
FRED C. PITMAN,
FRED W. DINSMORE.